US009028352B2

(12) United States Patent
Wilson et al.

(10) Patent No.: US 9,028,352 B2
(45) Date of Patent: May 12, 2015

(54) PULLEY DEVICE FOR TENSIONING IDLER OR RUNNER ROLLER

(75) Inventors: Pamphile Wilson, Linas (FR); Thierry Prouteau, Saint-cyr-sur-loire (FR); Cédric Narbonnais, Argenteuil (FR)

(73) Assignee: Aktiebolaget SKF, Gothenburg (SE)

( * ) Notice: Subject to any disclaimer, the term of this patent is extended or adjusted under 35 U.S.C. 154(b) by 230 days.

(21) Appl. No.: 12/997,768

(22) PCT Filed: Jun. 10, 2009

(86) PCT No.: PCT/EP2009/057177
§ 371 (c)(1),
(2), (4) Date: Dec. 13, 2010

(87) PCT Pub. No.: WO2010/006857
PCT Pub. Date: Jan. 21, 2010

(65) Prior Publication Data
US 2011/0111900 A1    May 12, 2011

(30) Foreign Application Priority Data

Jun. 23, 2008  (FR) ...................... 08 54141

(51) Int. Cl.
| *F16H 55/36* | (2006.01) |
| *B23P 11/00* | (2006.01) |
| *F16H 7/20* | (2006.01) |
| *F16C 13/00* | (2006.01) |

(Continued)

(52) U.S. Cl.
CPC ................. *F16H 7/20* (2013.01); *F16C 13/006* (2013.01); *F16H 2007/0865* (2013.01); *F16C 35/073* (2013.01)

(58) Field of Classification Search
CPC ................. F16C 13/006; F16C 35/073; F16H 2007/0865; F16H 7/20
USPC ........... 474/166, 183, 152; 384/903, 539, 537
See application file for complete search history.

(56) References Cited

U.S. PATENT DOCUMENTS 2,607,642 A * 8/1952 Gilbert .......................... 384/539
3,750,489 A   8/1973 Caldwell
(Continued)

FOREIGN PATENT DOCUMENTS

| EP | 1120584 A1 | 8/2001 |
| GB | 2321945 A  | 8/1998 |

(Continued)

OTHER PUBLICATIONS

Machine English Translation of WO 2007036407 A1.*
(Continued)

*Primary Examiner* — William E Dondero
*Assistant Examiner* — Diem Tran
(74) *Attorney, Agent, or Firm* — Bryan Peckjian; SKF USA Inc. Patent Dept.

(57) ABSTRACT

The pulley device for a belt or chain tensioning idler or runner roller comprises a pulley (12), a roller bearing (14), a spacer (18) for the mounting of the rolling bearing (14) and being capable of pressing against an element external to the device, a fastening screw (20) immobilized axially relative to the spacer (18), and at least one retaining ring (22) which is elastic radially and which is mounted inside a groove (60) made on the fastening screw (20), a portion of the ring (22) protruding radially into a recess (52) of the spacer (18).

16 Claims, 4 Drawing Sheets

US 9,028,352 B2
Page 2

(51) Int. Cl.
*F16C 35/073* (2006.01)
*F16H 7/08* (2006.01)

(56) References Cited

U.S. PATENT DOCUMENTS

| | | | |
|---|---|---|---|
| 3,797,900 A * | 3/1974 | Secola | 384/539 |
| 5,971,621 A * | 10/1999 | Oyafuso et al. | 384/539 |
| 7,041,020 B2 * | 5/2006 | Singer | 474/166 |
| 2002/0071739 A1* | 6/2002 | Mizuno et al. | 411/353 |
| 2003/0210840 A1* | 11/2003 | Ogawa | 384/477 |
| 2007/0025655 A1* | 2/2007 | Barraud et al. | 384/546 |
| 2008/0242523 A1* | 10/2008 | Stief et al. | 492/7 |
| 2014/0004985 A1* | 1/2014 | Lescorail et al. | 474/166 |

FOREIGN PATENT DOCUMENTS

| | | | | |
|---|---|---|---|---|
| WO | WO2007036407 A1 | | 4/2007 | |
| WO | WO 2007068595 A1 * | | 6/2007 | F16C 13/00 |
| WO | WO 2007085333 A1 * | | 8/2007 | F16H 7/20 |

OTHER PUBLICATIONS

WIPO Machine Translation of WO 2007036407.*

* cited by examiner

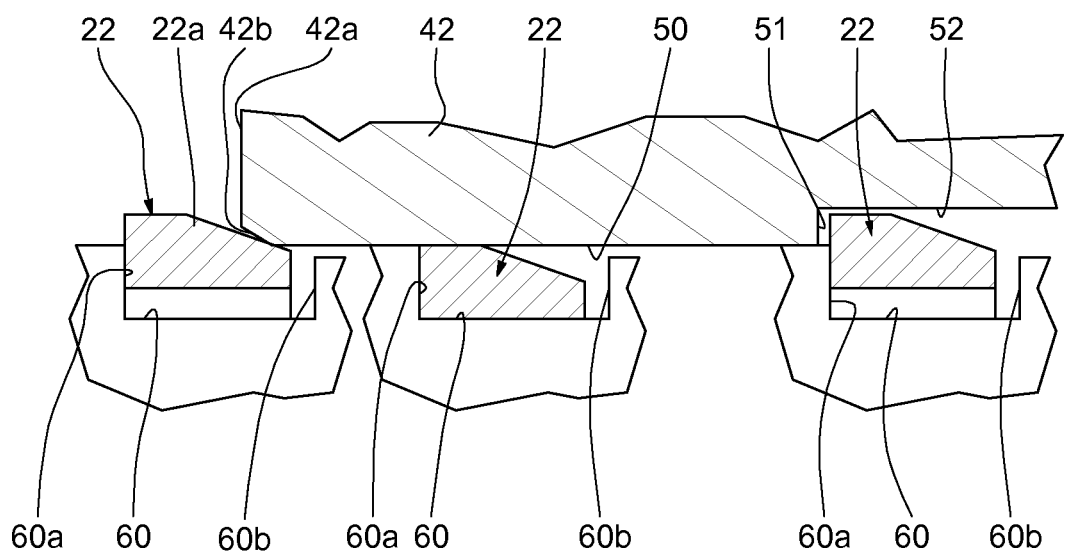
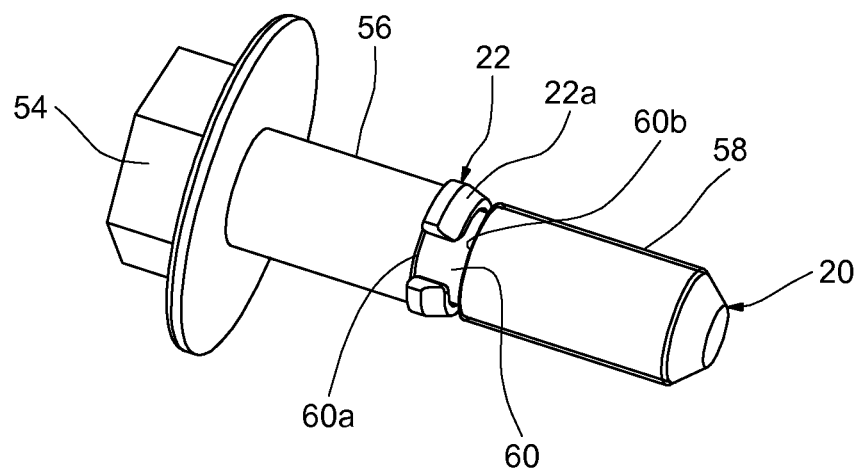

PULLEY DEVICE FOR TENSIONING IDLER OR RUNNER ROLLER

BACKGROUND OF THE INVENTION

The present invention relates to the field of pulley devices for tensioning idlers or runner rollers designed to interact with a chain or a belt, for example a distribution belt of an internal combustion engine of a vehicle.

Such rollers are usually used to keep a constant tension on the belt or chain in a determined range or to locally modify the path taken by the latter. These are then called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

To fasten the roller to its support, a spacer is usually used in association with the said screw or spindle. During this assembly, it is desirable that the spindle or the screw is axially secured to the other elements forming the roller and comprising the pulley. This provides an undismantleable assembly that is easy to handle and carry and can be easily mounted.

For this purpose, document DE-B4-100 03 208 discloses a pulley for a belt tensioning idler comprising a rolling bearing, a spacer for the mounting of the rolling bearing and a fastening screw immobilized axially relative to the spacer. The axial retention relative to the fastening screw and to the spacer is carried out by means of a continuous ring mounted by clamping onto a threaded portion of the fastening screw.

A major disadvantage of this solution is that it does not allow a particularly secure and effective retention of the fastening screw relative to the spacer. There is therefore a risk of accidental dismantling of the elements forming the pulley device.

Also known, through document WO-A1-2007/036407, is a pulley device for a tensioning idler comprising a pulley, a rolling bearing, a flange capable of pressing against an element external to the device, a fastening screw immobilized axially relative to the flange, and a friction ring provided between the flange and the screw.

The relative fastening of the flange and the fastening screw by friction contact does not make it possible to ensure in a certain manner over time the securing of these two elements.

SUMMARY OF THE INVENTION

The aim of the present invention is to remedy this disadvantage.

More particularly, the aim of the present invention is to provide a pulley device for a belt or chain tensioning idler or runner roller that is particularly easy to manufacture, to assemble and to mount and can be carried and handled without risk of the elements forming it coming apart.

The object of the present invention is also to provide a device that is ready to be mounted without particular preparation onto the support provided for this purpose.

In one embodiment, a pulley device for a belt or chain tensioning idler or runner roller comprising a pulley, a rolling bearing, a spacer for mounting the rolling bearing and being capable of pressing against an element external to the device, and a fastening screw immobilized axially relative to the spacer.

According to a general feature, the device comprises at least one retaining ring which is elastic radially and which is mounted inside a groove made on the fastening screw, a portion of the ring protruding radially into a recess of the spacer.

A good relative axial hold between the screw and the spacer is provided thanks to the radial interference that exists between the ring mounted inside the groove made on the screw and the recess of the spacer. This hold is obtained by abutment contact in the axial direction.

The retaining ring may advantageously be open at one point on its circumference. Preferably, it interferes radially with at least one lateral edge of the groove and with a shoulder partly delimiting the recess.

The retaining ring advantageously comprises an external surface that is at least partly conical. The said ring may be axially set back from a bearing surface of the spacer on the element external to the device.

In one embodiment, the retaining ring has, in the free state, an external diameter that is less than or equal to the diameter of the bore of the recess of the spacer, and/or that is greater than the inner edge of a shoulder partly delimiting the recess. The ring may also have, in the free state, an internal diameter that is greater than the diameter of the groove of the fastening screw.

Advantageously, the fastening screw comprises a head pressing against the rolling bearing axially on the side opposite to the spacer.

The invention also relates to a method of mounting a pulley device for a belt or chain tensioning idler or runner roller in which the operator mounts a first subassembly comprising a pulley, a rolling bearing and a spacer placed at least partly in the bore of the rolling bearing, the operator mounts a second subassembly comprising a fastening screw and a ring which is elastic radially and which is mounted in a groove of the said screw, and the operator inserts the said second subassembly into a bore of the spacer by axial pressure so as to radially restrict the ring in the groove of the screw and then axially pushes the second subassembly until a head of the screw presses against the rolling bearing and the ring at least partly reverts to its initial shape in a recess of the spacer and in the groove of the screw.

A further advantage of our solution lies in the easiness of fitting/assembly due to the fact that the ring is preliminary mounted onto the screw, and the design of the ring, which is self retracting, allows to fit the screw and the ring through the bore of the spacer.

BRIEF DESCRIPTION OF THE SEVERAL VIEWS OF THE DRAWINGS

The present invention will be better understood on studying the detailed description of the embodiments taken as non-limiting examples and illustrated by the appended drawings in which:

FIG. 3 illustrates partially the assembly or mounting of the pulley device of FIGS. 1 and 2, FIG. 4 is a view in perspective of a fastening screw of the pulley device of FIGS. 1 and 2.

DETAILED DESCRIPTION OF THE INVENTION

Figure 1:
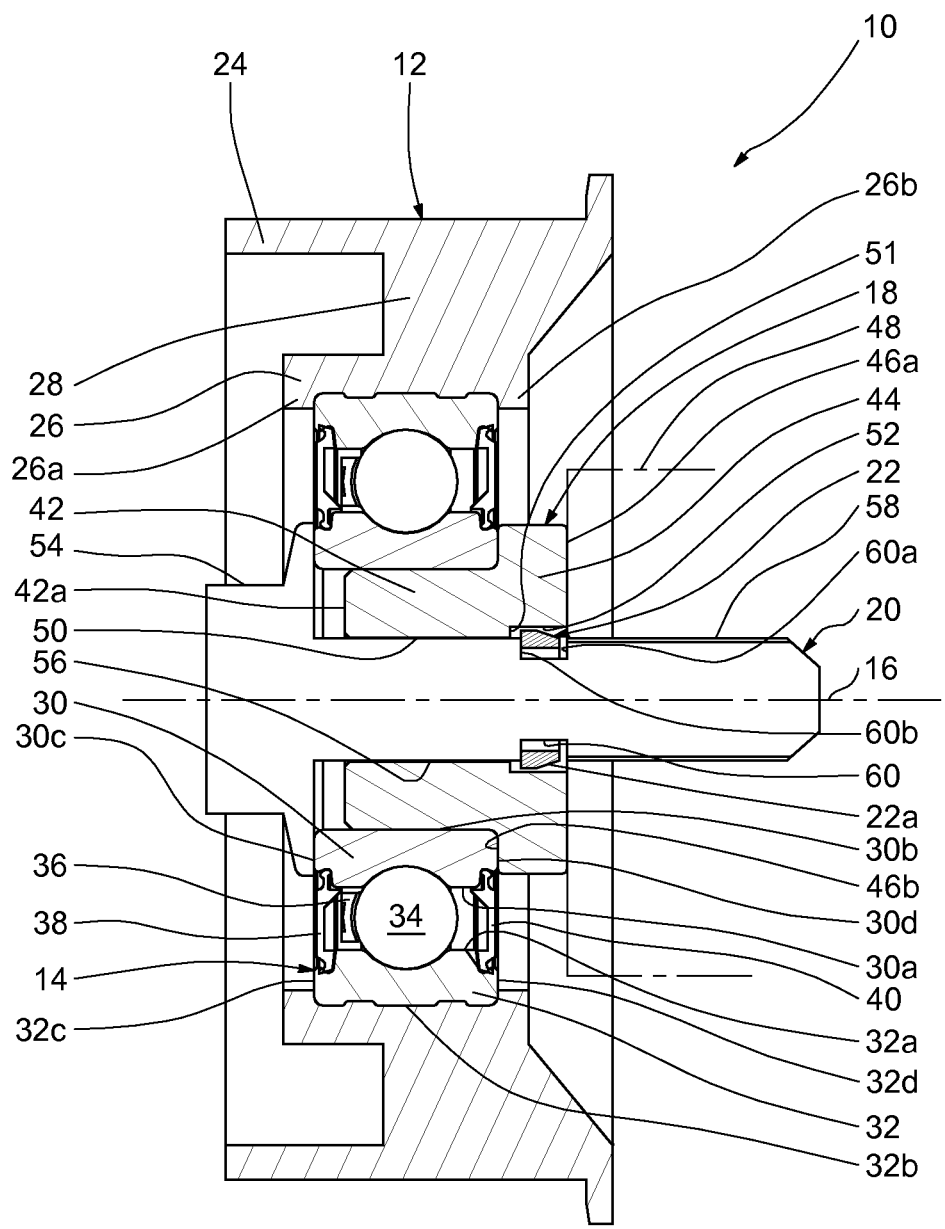
FIGS. 1 and 2 are views in axial section of a pulley device for a belt or chain tensioning idler or runner roller according to a first embodiment of the invention, respectively after and before assembly of the elements forming it.
Figure 2:
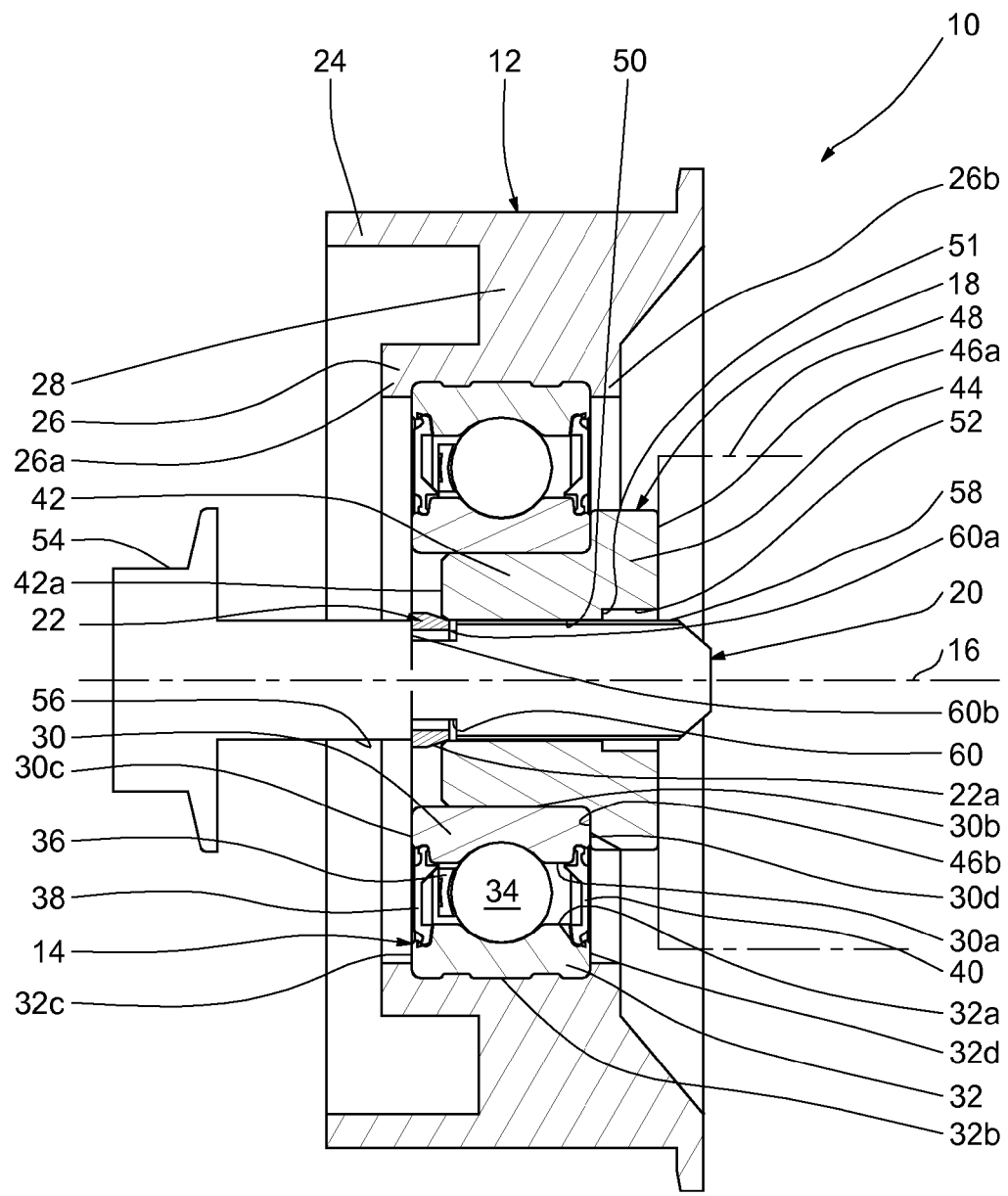

As can be seen in FIGS. 1 and 2, the pulley device for a belt or chain tensioning idler or runner roller, referenced 10 in its entirety, comprises a pulley 12, a rolling bearing 14, with a geometric axis 16, an annular spacer 18 and a fastening screw 20 coaxial with the axis 16.

In order to secure the fastening screw 20 and the spacer 18 together, a radially elastic retaining ring 22 is provided between these two elements as will be described in greater detail below.

The pulley 12 comprises an external axial portion 24 providing an external surface designed to interact with a belt or a chain (not shown), an internal axial portion 26 and a radial annular intermediate portion 28 connecting the said portions. The external portion 24 and internal portion 26 are coaxial with the axis 16. The internal axial portion 26 comprises two radial edges 26a and 26b directed radially inwards from its axial ends. The radial edges 26a and 26b delimit a bore furnished with annular ribs (not shown).

The rolling bearing 14 comprises an inner ring 30, an outer ring 32, a row of rolling elements 34, in this instance balls, placed between a toroidal raceway of the outer ring 32 and a toroidal raceway of the inner ring 30, a cage 36 retaining the circumferential spacing of the rolling elements 34, and two seals 38, 40 that are symmetrical relative to a radial plane passing through the centre of the rolling elements 34.

The inner ring 30 comprises an external surface 30a of revolution, extending axially and in which are arranged the raceway for the rolling elements 34 and grooves for achieving contact with lips of the seals 38, 40. The inner ring 30 also comprises a bore 30b partly force-fitted onto the spacer 18 and delimited by two transverse radial surfaces 30c and 30d.

The outer ring 32 is furnished with a bore 32a in which are arranged the raceway for the rolling elements 34 and grooves in which the seals 38, 40 are force-fitted. The seals 38, 40 provide a static seal with the rotating outer ring 32 and a dynamic seal with the non-rotating inner ring 30. The outer ring 32 also comprises an external surface 32b of revolution and extending axially and transverse radial surfaces 32c and 32d that are axially aligned with the radial surfaces 30c and 30d. Annular grooves (not referenced) are arranged on the external surface 32b of the outer ring 32 so as to match in shape with the ribs formed in the bore of the internal portion 26 of the pulley 12.

The pulley 12 is produced by overmoulding a plastic, such as a polyamide, onto the outer ring 32. The result of this is an excellent cohesion between these parts, in particular at the grooves of the outer ring 32 in which the molten plastic penetrates to form the ribs of the pulley by matching shape. The production of the pulley 12 by moulding makes it possible to give it complex shapes while retaining great lightness and relatively low manufacturing costs. Naturally, as a variant, the pulley could be made of sheet metal and be force-fitted onto the outer ring 32.

The spacer 18, of generally annular shape and with an axis 16, comprises an axial portion 42 onto which, over a portion of its length, the inner ring 30 of the rolling bearing 14 is adjusted, the said axial portion 42 being extended at one axial end, by a radial collar 44 delimiting a radial bearing surface 46a on a support 48 external to the device. The support 48 may for example be the engine block, an articulated arm or an eccentric of the associated automatic tensioning idler. Axially on the side opposite to the radial bearing surface 46a, the radial surface 30d of the inner ring 30 presses against a radial surface 46b of the collar 44.

The axial dimension of the axial portion 42 is smaller than that of the inner ring 30 so that a radial transverse surface 42a axially opposite to the radial bearing surface 46a is set back relative to the transverse radial surface 30c of the inner ring 30. The spacer 18 therefore leaves the said radial surface 30c completely free so that it can be used as a reference surface and press against any other radial surface.

The spacer 42 also comprises a cylindrical bore 50 through which the fastening screw 20 extends. The fastening screw 20 can be adjusted with a greater or lesser radial clearance in the bore 50. The bore 50 extends axially from the transverse surface 42a and is extended axially by an axial recess 52 opening onto the radial bearing surface 46a. The bore 50 and the recess 52 are separated or are connected by a radial shoulder 51. The recess 52 is therefore axially delimited by the shoulder 51 on the one hand and by the radial surface 46a on the other hand.

The fastening screw 20 comprises, for its part, a tightening head 54 and a shank furnished with a smooth portion 56 situated close to the head and being centred in the bore 50, and a threaded portion 58 at the opposite end from the said head. The threaded portion 58, in axial protrusion relative to the pulley 12, may be inserted into a tapped hole (not shown) created in the support 48. The head 54 presses against the transverse radial surface 30c of the inner ring 30 left free by the spacer 18.

Arranged axially between the smooth portion 56 and the threaded portion 58, on the external surface of the screw 20, is an annular groove 60 inside which the elastic retaining ring 22 is housed. The groove 60 is axially delimited by two opposite radial edges 60a, 60b. The edge 60a is situated axially on the side of the smooth portion 56, and the edge 60b on the side of the threaded portion 58. The axial dimension of the groove 60 is slightly greater than that of the ring 22, being for example less than 1.5 times that of the said ring.

The elastic ring 22 is open at one point on its circumference. It is shown here in the form of a circlip made of metal. In the free state, it has an internal diameter greater than the diameter of the groove 60 so that there is a radial clearance between these two elements. In the free state, the internal diameter of the elastic ring 22 is however less than the diameter of the bore 50 and of the diameter of the smooth portion 56 and of the threaded portion 58 so as to remain housed axially inside the groove 60.

The elastic ring 22 has, in the free state, an external diameter that is greater at the small-diameter edge of the shoulder 51 so as to be able to interfere radially not only with the radial edges 60a, 60b of the groove 60 but also with the shoulder 51 partly delimiting the recess 52. In the free state, the external diameter of the elastic ring 22 is less than or equal to the diameter of the bore of the recess 52 so that the said ring can notably be centred in the latter.

In other words, in cross section, the radial thickness of the elastic ring 22, i.e. the half-difference of the external diameter and of the bore of the said ring in the free state, is less than or equal to the half-difference between the diameter of the bore 50 and that of the groove 60. As a variant, the elastic ring 22 could have an external diameter that is greater than that of the recess 52.

To assemble the pulley device 10, the operator proceeds in the following manner.

The operator mounts on the one hand the spacer 18 in the bore of the inner ring of the rolling bearing until the collar 44 abuts on the radial transverse surface 30d of the said ring so as to form a first subassembly consisting of the pulley 12, the rolling bearing 14 and the said spacer 18. On the other hand, the operator mounts the elastic ring 22 in the groove 60 of the screw 20 so that it presses against the radial edge 60a of the said groove. As indicated above, there remains a radial clearance between the bore of the ring 22 and the bottom of the groove 60. The elastic ring 22 is in radial protrusion relative to the threaded portion 58 of the screw 20.

Then the operator, by axial pressure, inserts the screw 20 fitted with the elastic ring 22 into the bore 50 of the spacer 18. To make it easier for the elastic ring 22 to enter the bore 50 of the spacer 18, the said ring comprises, on its external surface, a frustoconical portion 22a extending inwards and designed to interact with an entrance bevel 42b situated at the axial end of the bore 50 of the spacer 18 and being connected to the transverse radial surface 42a.

Thanks to the slope of the frustoconical surface 22a of the ring 22 and to the entrance bevel 42b, the said ring is radially elastically restricted in the groove 60 as illustrated in FIG. 3 until it comes into contact with the bottom of the groove 60. In this position, the external surface of the elastic ring 22 is flush with the external surfaces of the smooth portion 56 and threaded portion 58. When the fastening screw 20 is pressed axially, the ring 22 can therefore move axially inside the bore 50 of the spacer 18.

When the head 54 of the screw 20 presses against the radial transverse surface 30c of the inner ring 30, the elastic ring 22 is situated at the recess 52, which allows it to revert, by elasticity, to its initial shape and to interfere radially or diametrically with the shoulder 51. The recess 52 therefore forms an expansion chamber for the elastic ring 22 which can revert to its initial diameter after having entered the bore 50. There is then again a slight radial clearance between the bore of the ring 22 and the bottom of the groove 60. The ring 22 therefore extends radially both into the groove 60 and the recess 52. The elastic ring 22 is fully housed axially inside the recess 52 so as to be axially set back from the radial surface 46a serving as a reference surface for the mounting of the device 10 against the support 48.

Naturally, it is easy to conceive that the groove 60 must be machined to such a distance from the head 54 of the fastening screw 20 that, when the latter butts against the transverse radial surface 30c of the rolling bearing, the lateral edge 60a of the groove 60 is situated at least axially at the entrance of the recess 52.

Figure 5:
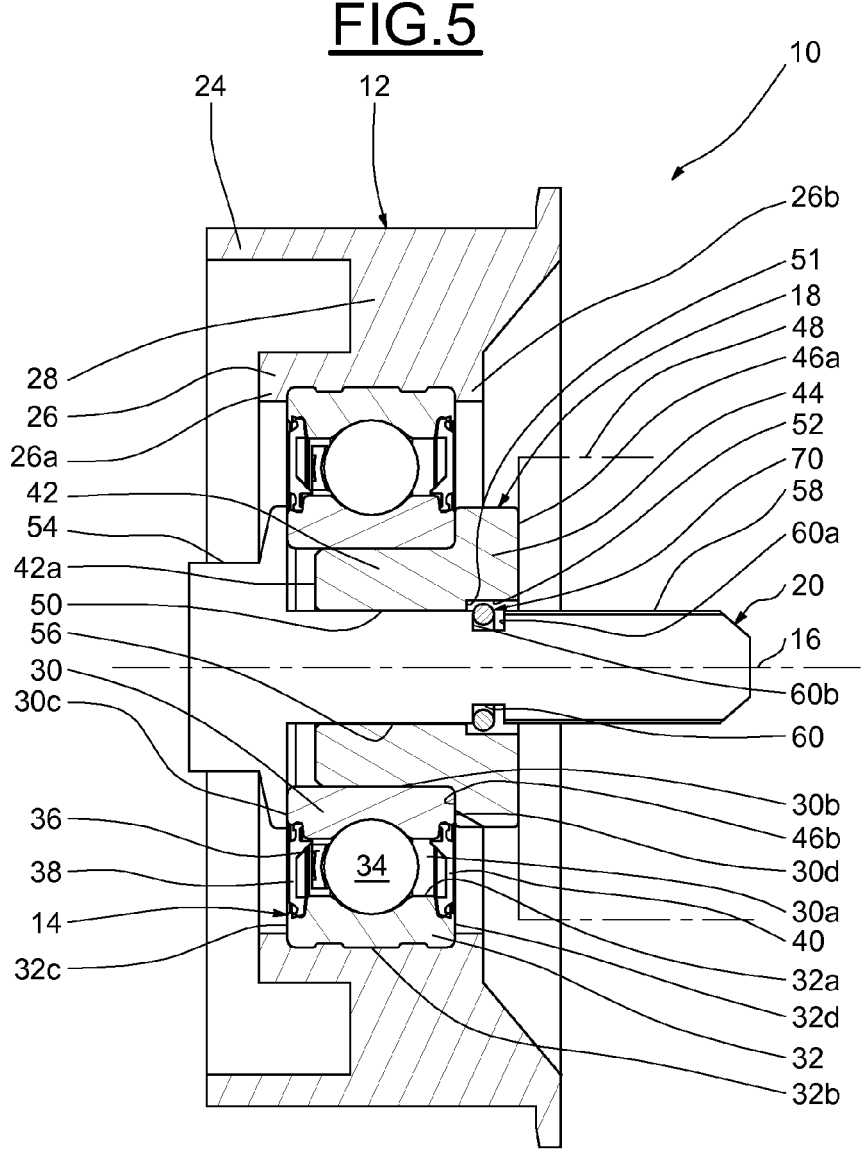
FIG. 5 is a view in section of a pulley device for a tensioning idler or runner roller according to a second embodiment of the invention.
Figure 6:
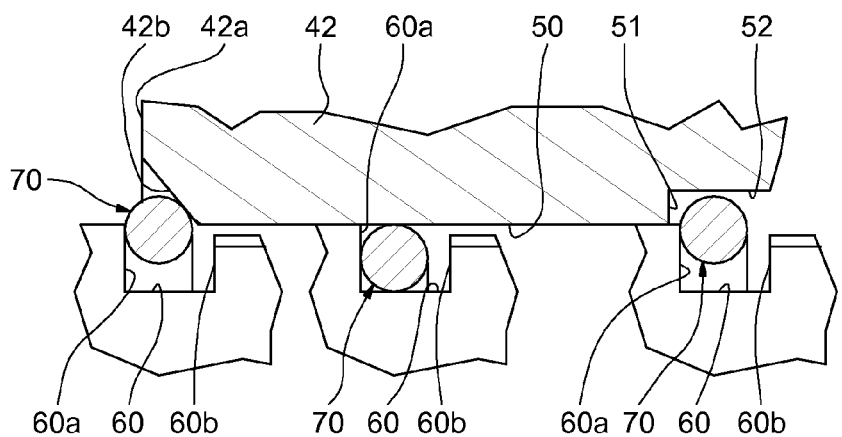
FIG. 6 is a partial view illustrating schematically the mounting of the pulley device of FIG. 5.

The variant embodiment illustrated in FIGS. 5 and 6 in which the identical elements bear the same reference numbers differs in that the elastic ring 70 has the shape of a torus or snap ring that is open at one point on its circumference. It is made in the form of a rolled wire with a circular cross section, the said wire being able to be made of synthetic material or metal. In this variant, the entrance bevel 42b is provided with a greater angle of inclination in order to promote the centring and the retraction of the said snap ring inside the groove 60 for its passage into the bore 50 of the spacer 18 when the screw 20 is mounted in the said bore.

Thanks to the invention, it is possible to manufacture and assemble in a simple, economic and easy manner an assembly consisting of the pulley, the rolling bearing, the fastening screw and the spacer, this assembly then being able to be carried without the risk of these elements coming apart and being ready to be mounted onto the associated support.

The invention claimed is:

1. A pulley device for a belt or chain tensioning idler or runner roller, the device comprising:
  a pulley,
  a rolling bearing,
  a spacer for mounting the rolling bearing, to press against an element external to the pulley device, and including a recess,
  a fastener positioned within the spacer and including a threaded portion, a smooth portion, and a groove having a rectilinear shape in axial cross-section, the groove being located axially between the threaded portion and the smooth portion, a first outer diameter of the threaded portion being equal to a second outer diameter of the smooth portion, the groove having an inner diameter less than the first and second diameters, the threaded portion having a second inner diameter that is greater than the inner diameter of the groove such that the groove and the threaded portion are not axially coextensive;
  an elastic retaining ring configured to be mounted inside the groove and being radially elastic such that an outer diameter of the elastic retaining ring can be reduced by a radially inward force, a free state outer diameter of the elastic retaining ring being greater than the outer diameters of the threaded portion and the smooth portion, a portion of the elastic retaining ring protruding radially into the recess of the spacer, and
  wherein the fastener and retaining ring are configured to combine to limit axial movement of the pulley device along a geometric axis thereof relative to the fastener.

2. The pulley device according to claim 1, wherein the retaining ring is open at one point on its circumference.

3. The pulley device according to claim 1, wherein the retaining ring has an external surface that is at least partly conical.

4. The pulley device according to claim 1, wherein the spacer has an external bearing surface and the retaining ring is axially spaced from the external bearing surface of the spacer.

5. The pulley device according to claim 1, wherein the spacer recess has a bore with an inner diameter and the retaining ring has an outer diameter in a free state that is one of less than and equal to the inner diameter of the spacer recess bore.

6. The pulley device according to claim 1, wherein the spacer has a shoulder partly defining the recess, the shoulder has an inner diameter, and the retaining ring has an outer diameter in a free state that is greater than the inner diameter of the shoulder.

7. The pulley device according to claim 1, wherein the retaining ring has an inner diameter that is greater than a diameter of the groove of the fastener.

8. The pulley device according to claim 1, wherein the fastener includes a tightening head configured to press axially against the rolling bearing on a side opposite to the spacer.

9. The pulley device of claim 1, wherein an axial width of the groove is no more than one and a half (1.5) times an axial length of the elastic ring.

10. The pulley device of claim 1, wherein the axial movement of the pulley along the fastener is limited to a distance not greater than the difference between a width of the groove, as measured parallel to the geometric axis, minus a width of the retaining ring, as measured parallel to the geometric axis.

11. The pulley device of claim 10, wherein the axial movement of the pulley along the fastener is limited to a distance not greater than half the width of the retaining ring.

12. A method of mounting a pulley device for a belt or chain tensioning idler or runner roller, the method comprising the steps of:
  providing a first subassembly including a pulley, a rolling bearing and a spacer placed at least partly in the bore of the rolling bearing, the spacer having a bore and a recess,
  providing a second subassembly including a fastener with a head, a threaded portion, a smooth portion, and a retaining ring which is elastic radially and which is mounted in a groove of the fastener, the groove having a rectilinear shape in axial cross-section, the groove being located axially between the threaded portion and the smooth portion, wherein a first outer diameter of the threaded portion is equal to a second outer diameter of the smooth portion, the threaded portion having a second inner diameter that is greater than the inner diameter of the groove such that the groove and the threaded portion are not axially coextensive;

inserting the second subassembly into the bore of the spacer by axial pressure so as to radially restrict the retaining ring in the groove of the fastener, and axially pushing the second subassembly until the head of the fastener presses against the rolling bearing and the retaining ring at least partly reverts to an initial shape in the recess of the spacer and in the groove of the fastener, wherein the second subassembly limits movement in a first direction of the first subassembly relative to the second subassembly, the first direction being parallel to a geometric axis of the first subassembly, wherein the groove of the fastener and the retaining ring are configured such that the retaining ring is mounted in the groove of the fastener before, during, and after inserting the second subassembly into the bore of the spacer and axially pushing the second subassembly until the head of the fastener is positioned adjacent the roller bearing.

13. The method of claim 12, wherein after the retaining ring at least partly reverts to the initial shape in the recess of the spacer and in the groove of the fastener, the movement of the first subassembly being limited to a distance of no more than half the width of the retaining ring, as measured parallel to the geometric axis.

14. The method of claim 12, wherein the step of providing the second subassembly further comprises the retaining ring having first and second sides each generally oriented in a different axial direction, wherein the retaining ring is radially compressible when force is exerted against the first side, but not when force is exerted against the second side.

15. The method of claim 14, wherein the step of providing the second subassembly further comprises the fastener having a tightening head on one end thereof, the retaining ring being configured to be compressible radially inwardly when abutting an object that comes into contact with a portion of the retainer ring located outside the retaining ring such that the object contacts a side of the retaining ring generally facing opposite from the tightening head of the fastener.

16. A pulley device for a belt or chain tensioning idler or runner roller, the device comprising:

a pulley, a rolling bearing, a spacer for mounting the rolling bearing, configured to press against an element external to the pulley device, and including a recess having an annular shape forming a shoulder with a rectilinear cross-section formed by first and second recess surfaces, the first recess surface being perpendicular to a geometric axis of the pulley device and the second recess surface being parallel to the geometric axis, and a fastener axially fixed relative to the spacer and including a threaded portion, a smooth portion, and a groove having a rectilinear shape in axial cross-section, the groove being located axially between the threaded portion and the smooth portion, a first outer diameter of the threaded portion being equal to a second outer diameter of the smooth portion, the threaded portion having a second inner diameter that is greater than the inner diameter of the groove such that the groove and the threaded portion are not axially coextensive, the groove having an inner diameter less than the outer diameters of the smooth portion and the threaded portion, and at least one radially elastic retaining ring mounted inside the groove and being radially elastic such that an outer diameter of the elastic retaining ring can be reduced by a radially inward force, the at least one radially elastic retaining ring having a free state outer diameter greater than the outer diameters of the smooth and the threaded portions such that a portion of the ring protrudes radially into the recess of the spacer, wherein the retaining ring interferes radially with at least one lateral edge of the fastener groove and with the shoulder partly defining the recess and while the groove defined by the fastener is configured to limit axial movement of the retaining ring relative to the pulley device such that the retaining ring does not move axially past a terminal end of the second recess surface.

\* \* \* \* \*